United States Patent [19]

Dawes

[11] Patent Number: 5,456,959
[45] Date of Patent: Oct. 10, 1995

[54] ENVIRONMENTAL ANTIOXIDANT WRAP/ENCLOSURE FOR AN AERIAL ENCLOSURE

[75] Inventor: Keith Dawes, Raleigh, N.C.

[73] Assignee: Raychem Corporation, Menlo Park, Calif.

[21] Appl. No.: 146,776

[22] Filed: Nov. 2, 1993

Related U.S. Application Data

[63] Continuation of Ser. No. 594,765, Oct. 9, 1990, abandoned.

[51] Int. Cl.[6] .................................................. H02G 15/113
[52] U.S. Cl. ..................... 428/34.1; 428/35.9; 428/36.9; 428/36.91; 428/34.9; 174/92; 174/93; 174/84 R; 174/74 R; 174/77 R; 174/135; 138/140
[58] Field of Search ................. 428/35.8, 35.9, 428/36.9, 36.91, 57, 43, 34.1, 34.9; 138/89, 99, 140, 141, 142, DIG. 6; 174/84, 135, 74 R, 77 R, 93, 92

[56] References Cited

U.S. PATENT DOCUMENTS

| | | | |
|---|---|---|---|
| 3,856,980 | 12/1974 | Puckowski et al. | 174/23 C |
| 3,899,807 | 8/1975 | Souisl et al. | 24/255 C |
| 3,962,554 | 6/1976 | Eigel | 174/74 A |
| 4,129,552 | 12/1978 | Galaj et al. | 260/45.9 |
| 4,233,470 | 11/1980 | Wight, Jr. | 174/120 C |
| 4,260,661 | 4/1981 | Walters et al. | 428/389 |
| 4,282,397 | 8/1981 | Siedenberg et al. | 174/92 |
| 4,520,146 | 5/1985 | Hansen | 524/94 |
| 4,701,574 | 10/1987 | Shimirak et al. | 174/93 |
| 4,705,571 | 11/1987 | Lange et al. | 106/287.1 |
| 4,714,801 | 12/1987 | Koblitz et al. | 174/88 R |
| 4,726,993 | 2/1988 | Zaopo | 428/379 |
| 4,731,271 | 3/1988 | Heucke et al. | 428/35.9 |
| 4,792,472 | 12/1988 | Meltsch | 428/35.9 |
| 4,824,883 | 4/1989 | Walters et al. | 524/93 |
| 4,885,194 | 12/1989 | Tight, Jr. et al. | 428/34.9 |
| 4,962,286 | 10/1990 | Jensen et al. | 174/92 |

FOREIGN PATENT DOCUMENTS

| | | | |
|---|---|---|---|
| 2583314 | 12/1986 | France | B05D 7/00 |
| WO90/04227 | 4/1990 | WIPO | H02G 15/18 |
| WO90/13901 | 11/1990 | WIPO | H01B 7/28 |

OTHER PUBLICATIONS

Patent Abstracts of Japan: vol 6, No. 249 (M–177) (1127) 8 Dec. 1982 A 57 144 716 (Nippon Denshin Denwa Kosha) 7 Sep. 1982.

*Primary Examiner*—Charles R. Nold
*Attorney, Agent, or Firm*—Herbert G. Burkard; A. Stephen Zavell; William D. Zahrt

[57] ABSTRACT

A tooless environmental splice enclosure capable of fitting within an aerial splice case is disclosed. The environmental closure permits sealing and reentry to a cable splice region.

11 Claims, 2 Drawing Sheets

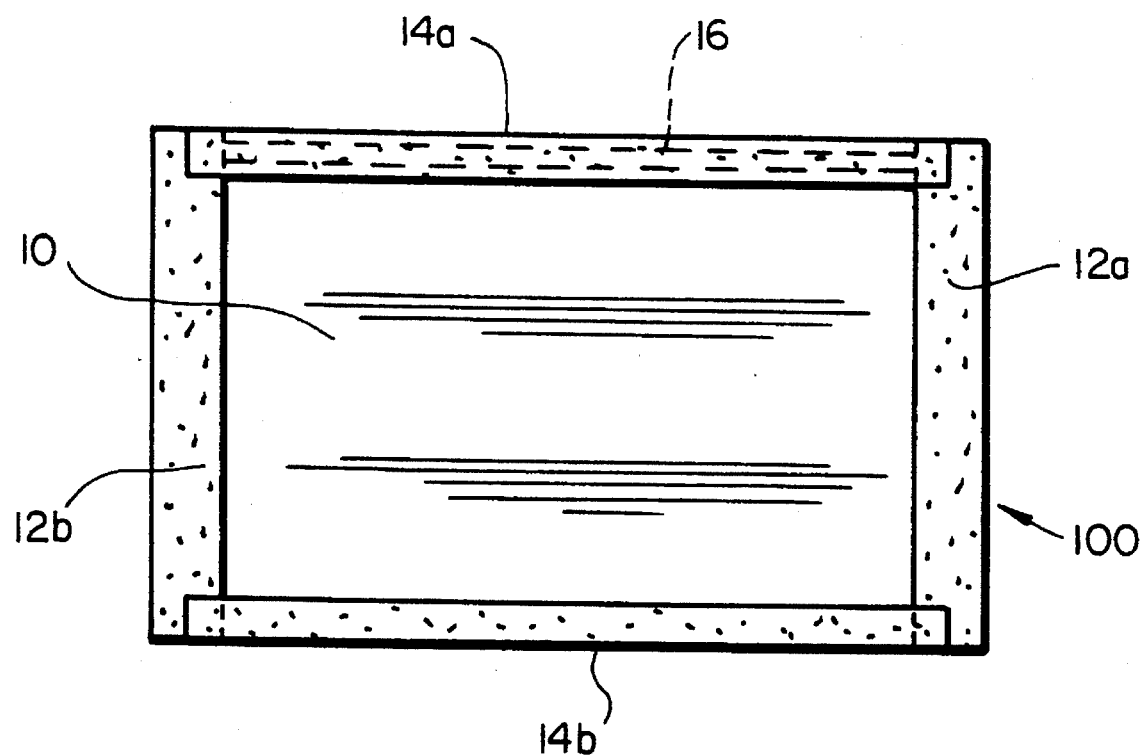
FIG_1
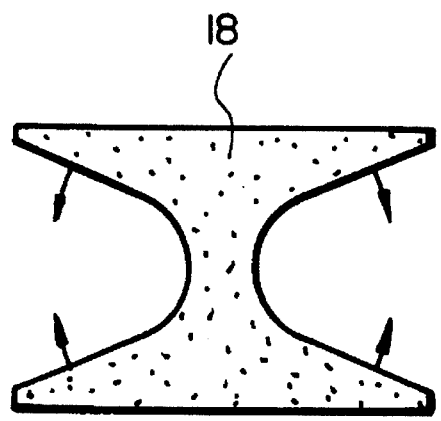
FIG_2

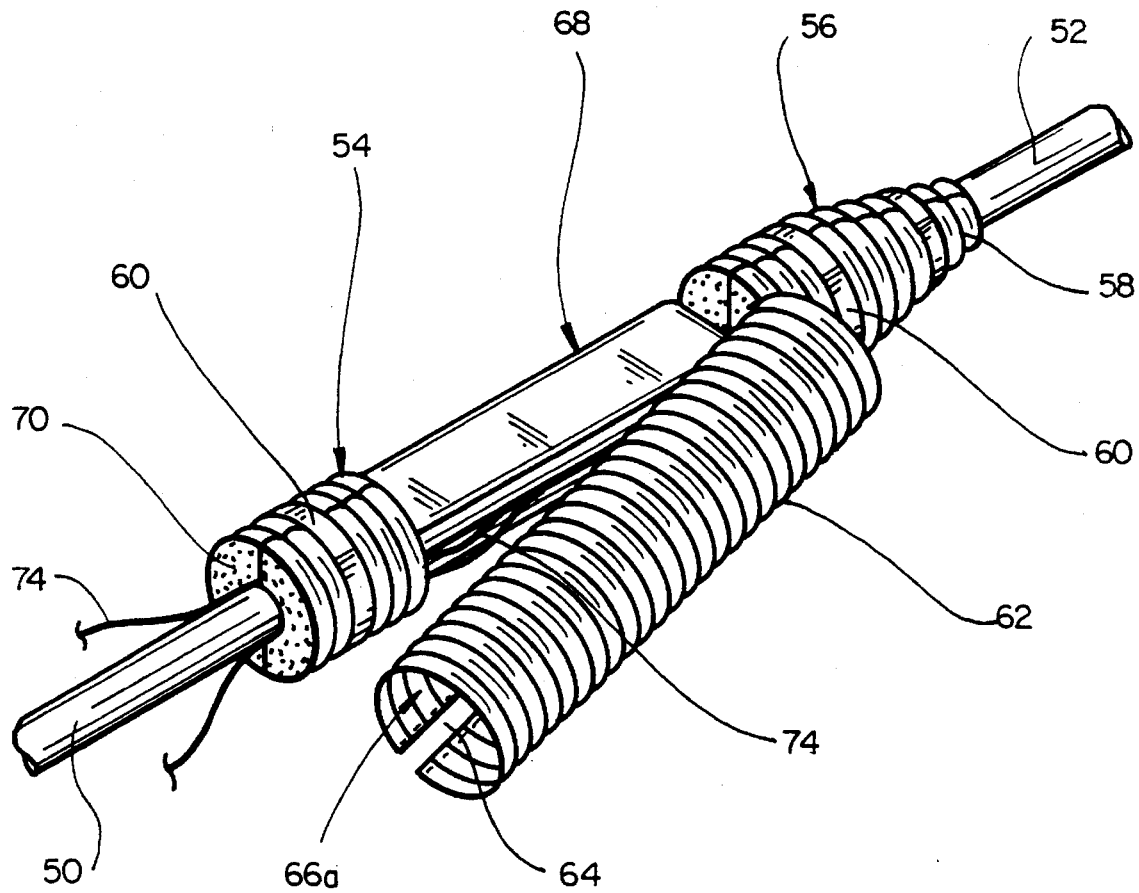
FIG_3

5,456,959

ENVIRONMENTAL ANTIOXIDANT WRAP/ENCLOSURE FOR AN AERIAL ENCLOSURE

This application is a file wrapper continuation of application Ser. No. 07/594,765 filed Oct. 9, 1990, abandoned.

CROSS REFERENCE TO RELATED APPLICATIONS

This application is related to U.S. Ser. No. 07/254,335 filed Oct. 6, 1988, now U.S. Pat. No. 4,962,286 issued Oct. 9, 1990, and U.S. Ser. Nos. 07/350,657 and 07/419,408 filed May 10 and Oct. 10, 1989, respectively. Each specification or patent is completely incorporated herein by reference for all purposes and the benefit of the filing dates of each is also claimed.

1. Field of the Invention

This invention relates to an environmental protective wrap for an aerial splice enclosure. More particularly, this invention relates to an antioxidant wrap for an aerial cable closure. In a particularly preferred embodiment, this invention relates to a sealed wrap for an aerial closure for spliced cables which retards oxygen permeation, ultraviolet degradation and/or exposure to water either liquid or vapor on the fine internal wires in the cable as well as providing a source of wire and cable protecting antioxidants and acid scavengers.

2. Background of the Invention

Cables carrying multiple conductors especially telecommunications cables which carry a plurality of fine insulated wires within the body of the cable are subject to premature failure when the cable must be cut open to splice the cable either for drop wires or in replacing a section of damaged cable. Once the outer protective jacket of the cable including metal jacket is severed for a splice, the finer inner wires require protection from the ingress of water, and the deleterious action of oxygen, ultraviolet radiation degradation, as well as cable and wire antioxidant depletion.

Splice enclosures such as Trac® Splice Enclosure from Raychem or similar closures provide protection to the fine inner wires from ultraviolet radiation. These closures are preferred by telephone craftspeople because the aerial installation is done without tools. However, a more complete environmental seal and protective system to minimize the exposure of the inner insulated wires to the environment would be desirable to assist in preventing wire insulation imbrittlement, i.e., cable insulation cracking.

Thus, it would also be highly desirable to have an environmental closure capable of fitting within a standard aerial enclosure that will enhance the protection of the spliced portion of the cable.

It is thus an object of this invention to provide an environmental control wrap capable of fitting within an existing aerial enclosure and protecting the splice region while providing access to the splice area once the craftsperson decides reentry to the splice is necessary. It is also an object of this invention to provide enhanced moisture, vapor and oxygen and antioxidant protection for the fine wires within the cable. Additional objects of the invention will be apparent from the following description.

SUMMARY OF THE INVENTION

This invention provides an antioxidant wrap and environmental seal for the spliced area of a cable, and particularly a telecommunication cable having the plurality of fine internal wires. The invention possesses the previously recited desirable objects and retains the desired features recited previously while also providing additional benefits readily apparent to the skilled artisan from the following more detailed description.

Generally, the invention consists of a polymeric material with a relatively high loading of a volatile antioxidant and/or acid scavenger. A barrier material is placed on one side such that antioxidant is only lost from one side, i.e., towards the wires. At high loadings of stabilizer (about 5 to about 10% and greater), the stabilizer will readily bloom to the surface of the non-barrier side, and over time will volatilize into the environment surrounding a splice. Ingress of the stabilizer into the insulation will then occur and thereby extend the life of the wire.

More specifically, the invention provides for an antioxidant resistant enclosure. The environmental closure and antioxidant wrap is formed by materials which, although providing a barrier to the ingress of water and oxygen, can be easily be disassembled to provide access to the splice area.

BRIEF DESCRIPTION OF THE DRAWINGS

FIG. 1 illustrates a top view of the environmental sealing film.

FIG. 2 illustrates a cross-sectional view of a sealing core for a two-cable branchout configuration.

FIG. 3 illustrates an aerial telecommunications splice enclosure.

DETAILED DESCRIPTION OF THE INVENTION

The invention will be more particularly described with reference to the Figures. FIG. 1 illustrates a top plan view of the environmental sealing film 100 including optional reenterable sealing means 12 and 14. More specifically, the environmental sealing film 100 comprises an oxygen/moisture impervious material 10 with optional strips of sealing material 12a and 12b and optional longitudinal sealing strips 14a and 14b. An optional support bar 16 on the surface opposite to the surface on which the sealing material 14a/b adheres provides support for the formation of the longitudinal seam.

A suitable environmental liner film 10 comprises a layer of a tear resistant material such as cross-plies of oriented HDPE high density polyethylene (HDPE). A suitable material is marketed under the trade name Valeron® and a suitable thickness is about 3 thousands of an inch. However, any tear-resistant material is suitable for this purpose such as linear low density polyethylene, nylon, polypropylene, polyester sheets, i.e., (Mylar®), and like. Optionally bonded to the tear resistant material with a suitable adhesive about 1 thousands of an inch thick such as Surlyn® adhesive is a thin-flexible moisture and oxygen barrier of aluminum foil about 0.00035 inches thick or other suitable oxygen-water barrier material. Finally, the liner 10 is completed with a second film of either HDPE or Surlyn® film about 3 thousand of an inch thick adhering to the aluminum foil through about one thousands of an inch thick layer of a suitable adhesive such as a Surlyn® adhesive. This layer contains the antioxidant and/or acid scavenger. Although this particularly preferred construction has been specified, any moisture-oxygen barrier material having abrasion and tear resistance is suitable for use within the invention. A single HDPE film with a surface loaded with the antioxidant and/or acid scavenger is also suitable in less rigorous environments.

The central region of the sheet 10 contains a suitable material such as felt, cloth, or a surface of the material itself, and the like, which contains the acid scavenger or acid scavenger along with antioxidants, desiccants, oxygen scavengers, and the like. The antioxidant loading is greater than 5% and between about 5% to about 10%. Santonox R® antioxidant is preferred. A preferred acid scavenger-antioxidant combination is, for example, Ca $CO_3$ and Santonox R®, a concentration level of from about 0.01 to about 1.0 grams/sq inch ($g/in^2$) and preferably about 0.01 to about 0.5 $g/in^2$ and most preferably about 0.07 $g/in^2$ ±about 0.01 $g/in^2$ and 0.001 $g/in^2$ to about 1.0 $g/in^2$, and preferably about 0.01 $g/in^2$ to about 0.5 $g/in^2$ and most preferably about 0.01 $g/in^2$ to about 0.5 $g/in^2$ and most preferably about 0.01 $g/in^2$ to about 0.5 $g/in^2$ and most preferably about 0.03 $g/in^2$ ±about 0.01 $g/in^2$, respectively.

The absorbant/adsorbent material is adhered to or formed in the layer 10 by any suitable means such as glue, fusing, thermoforming, and the like. Preferred materials not thermoformed with the absorbant/adsorbent material are felts. A particularly preferred felt is a polyester felt ⅟₁₆" or less in thickness preferably a 6 dernier 12 oz/sq yard, product number #2205 of Pacific States Felt and Mfg. Co., Inc. Hayward, Calif. Prior to affixing the felt, the material is treated with the acid scavenger or acid scavenger-antioxidant combination from a water or alcohol based slurry. The concentration is a function of the volume of polyolefin insulation to be protected.

If the film 10 is intended to be reenterable, adhered to a surface of the film 10 are the optional wide edged strips 12a and 12b of a sealing material capable of removably sealing to the cable or the non-easily removable surface built-up or around the cable surface. Although the gel strips can be adhered to either surface, preferably, the gel strips adhere to the cross-ply of HDPE surface, i.e., HDPE sheet is adjacent the cable splice. The sealing material is preferably a gel or a gel-based material having a cone penetration of from about 50 to 350 $10^{-1}$ mm) and an ultimate elongation of at least about 100% and preferable greater than about 200%. A suitable soft compliant sealing material is about a 2-inch wide and 0.040-inch thick GelTek® tape and more specifically GelTek®1000 Strip Tape, a product of the Raychem Corporation. The tape is adhered to the film 10 through the use of an adhesive such as a silicone adhesive or similar material such as RTV® silicone. On the same side of film as strips 12a and 12b and along the longitudinal seam of the film 10 are additional optional strips of sealing material 14a and 14b. Preferably, strips 14a and 14b are a gel material. A suitable soft compliant sealing material is about a 1-inch wide and about 0.040-inch thick strip of GelTek®1000 sealing tape. Other suitable sealing under-pressure gels are silicone gels, gels based upon Kraton™, urethane gels, an d mixtures thereof, as well as gels described in U.S. Pat. Nos. 4,600,261; 4,610,738; 4,634,207; 4,643,924; 4,647,717; 4,690,831; 4,701,574; and 4,718,678, all of said patents completely incorporated herein by reference for all purposes.

On the major surface opposite to the surface on which the sealing strips 12a, 12b, 14a, and 14b adhere is an optional support strip 16. Preferably the strip 16 adheres to the Surlyn® film/aluminum side. The support strip provides a firm backing for pressuring the sealing strips 14a and 14b together to form the longitudinal seal therebetween. A suitable strip is selected from the group consisting of a polypropylene strip, a polyethylene strip, a metal strip, mixtures thereof, or the like. More generally, the backing strip need only provide sufficient support to enable an adequate longitudinal seal to be made between strips 14a and 14b when the strips are brought together around the splice region between the cables.

Although the sealing strips 12a, 12b, 14a, and 14b can seal directly to a large diameter cable, the splice area is generally of greater diameter then the cables. Thus, the cable diameters are preferably built-up to a diameter which more closely approximates the diameter of the splice area. The build-up is accomplished with a sealing means such as a rubber mastic tape. A suitable rubber mastic tape is 3M's 2228 mastic rubber tape. The sealing means preferably has a sticky surface to adhere to the cable and itself. However, the tape backing surface should permit the easy removal of the environmental sealing film 10.

In a two branchout configuration, the smaller cable diameters are preferably build up through the application of a sealing means such as 3M's 2228 mastic rubber tape. Around the built-up cables is a sealing core means such as a mastic core 18 or the gel cores in U.S. Pat. No. 4,944,973, completely incorporated herein by reference for all purposes. The sealing means is illustrated in FIGS. 2. The mastic or gel core 18 is folded around the cables as illustrated by the arrows. The material is preferably maliable down to about 0° C. To restrain the flow of a mastic sealing material at temperatures of up to about 60° C., the surfaces facing towards and away from the splice region are optionally coated with a flow-restraining means such as a natural or synthetic foam 10a and 20b. The flow restraining means 20a and 20b inhibit to flow of the material 18 into the splice are where its removal upon reentry is messy and time consuming. Gels will generally not require the flow restraining means.

More specifically, mastic is an adherent, cohesive sealing material intended to fill a gap between two components. A mastic can deform or yield plastically, that is, undergo viscous flow, both during application and in subsequent service at ambient temperatures. Mastics may consist of mixtures of substantially non-crystalline materials, for example, bituminous materials elastomers, or thermoplastic polymers, and may contain inert fibrous or powdered fillers. Examples of mastic materials are disclosed in U.S. Pat. Nos. 3,243,211; 3,291,819; 3,396,460; and 4,206,786, each patent is completely incorporated herein by reference for all purposes. Of course the mastic is optimized for the specific environment. A suitable method for determining the viscosity of mastics is set forth in ASTM D-3579 (Procedure A or B).

After the sealing core branchout means 18 is applied to the cables, the core 18 is coated with a foam or thin rubber tape or optionally wrapped with a diameter enhancing sealing means such as 3M's 2228 mastic rubber tape. This further increases the diameter and provides a surface to which the sealing gel 12 can adhere but from which it can be easily removed. The combination provides an antioxidant, oxygen, and moisture barrier environmental closure wherein the environmental film is easily applied and removed without tools or messy mastic removal.

FIG. 3 illustrates an aerial closure embodiment of the invention used to splice two cables 50 and 52 together with the film 10 surrounding the fine wires in the splice. The cables 50 and 52 are normally spliced together across a cable splice area 68 permitting the drop wire 74 to be withdrawn therefrom. On opposite sides of the splice area the cable includes suitable sealing means 54 and 56 such as gel-filled enclosures as taught in U.S. Pat. Nos. 4,701,574, and 4,880,676 the specifications of which are completely incorporated herein by reference for all purposes. Optionally, the seals can include a tapered portion 58 and means to maintain sealing gel 70 under compression against the cable within the sealing means 54 such as tie wraps. Between end pieces 54 and 56 will be a corrugated cover 62 split at 64 to permit its spreading the insertion over ends 54 and 56. Although not necessary, the corrugations on 62 match the corrugations on 52 and 54 to help affix the jacket 62 thereto. Optionally, the closure 300 can be fabricated without corrugations and permit a friction fit between pieces 54 and 56. suitable locking means such as screws or clips are incorporated at the split end 64, not illustrated, to hold the sealing tube 62 in place. The acid scavenger, antioxidant, oxygen scavenger, or mixtures thereof can be fabricated on the inside of the tubular member 62 by thermoforming processes known in the art or wrapped around the wires in the cable splice area with a wrap illustrated in FIG. 1. More generally, the acid scavenger or mixture of degradation retarding components can be incorporated anywhere in the closure system provided it provides a source of protection for the wire insulation.

Examples of suitable antioxidant are tested in Tables I and II below.

Table I

Antioxidants

Vanox GT®; R. T. Vanderbilt Co. Tris (3,5-di-tert-butyl-4-hydroxybenzyl)isocyanurate
Irganox®1010; Ciba-Giegy Corp. Tetrakis [(methylene 3(3', 5'-di-t-butyl-4'-hydroxyphenyl)] propionate methane
Irganox®1076; Ciba-Giegy Corp. Octadecyl 3-(3', 5', -di-tert-butyl-4'-hydroxyphenyl) propionate
Santonox R®; Monsanto Corp. 4,4' thiobis-(6-tert-butyl meta cresol)
Santowhite Powder®, Monsanto Corp. 4,4'-butylidene bis (6-tert-butyl meta cresol)
Ethanox®330, Ethyl Corp. 1,3,5-trimethyl2,4,6-tris (3,5, -di-tert-butyl-4-hydroxy benzyl) benzene
Vanox®1290, R. T. Vanderbilt Co., Inc. 2,2'-Ethylidene-bis (4,6-di-tert-butyl phenol)
Ultranox®246, Borg-Warner Chemicals 2,2'-methylene-bis- (4-methyl-6-tert-butyl phenol)
Naugard®445, Uniroyal Chemical Company, Inc. 4,4'Di (alpha,alpha-dimethylbenzyl)diphenylamine
Mixxim®AO-30, Fairmount Chemical Co., Inc. 1,1,3-tris(2 methyl)-4-hydroxy-5-tert-butylphenyl butane
Cyanox®425, American Cyanamid Co. 2,2'Methylene bis(4-ethyl-5-tert-butyl phenol)
Ethanox®702, Ethyl Corp. 4,4'-methylene-bis-(2,6-di-tert-butylphenol)
Naugard®451, Uniroyal Chemical Company, Inc. Proprietary alkylated hyrdroquinone Of these antioxidants, those particularly preferred can be selected from the group listed in Table II:

Table II

Preferred Antioxidants

Santowhite Powder®, Monsanto
Santonox R®, Monsanto
Ethanox®330, Ethyl Corp.

Ethanox®702, Ethyl Corp.
Vanox®1290, R. T. Vanderbilt Co.
Ultranox®246, Borg-Warner Chemicals
Naugard®451, Uniroyal Chemical Company
Naugard®445, Uniroyal Chemical Company
Mixxim®AO-30, Fairmount Chemical Co.
Cyanox®425, American Cyanamid Co.

Santonox R® is particularly preferred. Optionally, oxygen scavengers can be included alone or with the acid scavengers, acid scavengers and antioxidants, or antioxidants.

Examples of suitable acid scavengers are listed in Tables III and IV below:

Table III

Acid Scavengers

Zinc oxide
Calcium oxide (lime)
Dibasic lead phthalate
Sodium carbonate
Calcium carbonate
Sodium hydroxide (Ascarite®)
Sodium bicarbonate
Calcium hydroxide
Ammonia; amines
Epoxy compounds (epoxidized soybean oil)
Barium, cadmium, zinc stearates (or other carboxylates)
Dibasic lead phosphite
Tribasic lead sulphate
Sodium phosphate
Dialkyl tindichloride Of these scavengers, those having a pH greater than about 5, i.e., more alkaline, are particularly preferred materials and can be selected from the group listed in Table IV:

Table IV

Preferred Acid Scavengers

Sodium carbonate and/or hydrates thereof
Calcium carbonate
Sodium bicarbonate
Calcium oxide
Calcium hydroxide
Zinc oxide These acid scavengers may also be beneficially associated either in a separate means or together with antioxidants, such as one or more of the compounds listed in Table I.

The invention has been described with referenced to particularly preferred embodiments. Modifications which would be obvious to one of ordinary skill in the art are contemplated to be within the scope of the invention.

I claim:

1. A cable sealing apparatus comprising:
   a first end seal;
   a second seal spaced longitudinally from the first end seal by a housing;
   a housing separating the first and second end seals to provide a cable splice area therebetween; and
   a wrap which surrounds a cable splice and is contained within the housing, said wrap is a polymeric wrap and includes antioxidant compound(s) and acid scavenger compound(s), the polymeric material having an antioxidant concentration of from about 5% to about 10% of the polymeric material and an acid scavenger concentration of from about 0.01 g/in$^2$ to about 1 g/in$^2$, and wherein the polymeric material further comprises an oxygen and moisture barrier on a side of the wrap facing the housing.

2. The apparatus according to claim 1 wherein the antioxidant and acid scavenger on the interior surface of the housing is contained in a felt and the concentration of the acid scavenger is from about 0.01 to about 1.0 g/in$^2$ and the antioxidant concentration is from about 0.001 to about 1.0 g/in$^2$.

3. The apparatus according to claim 1 wherein the antioxidant is formed on the interior surface by thermoforming.

4. The apparatus according to claim 1 wherein the antioxidant is between about 5% to about 10% of the composition of the interior surface of the housing.

5. The apparatus according to claim 4 wherein the antioxidant is selected from the group consisting of tris (3,5-di-tert-butyl-4-hydroxybenzyl)isocyanurate; tetrakis propionate methane; octadecyl 3-(3',5',-di-tert-butyl-4'-hydroxyphenyl) propionate; 4,4'thiobis-(6-tert-butyl meta cresol); 4,4'-butylidene bis(6-tert-butyl meta cresol); 1,3,5-trimethyl-2,4,6-tris ( 3,5,-di-tert-butyl-4-hydroxy benzyl) benzene; 2,2'-ethylidene-bis (4,6-di-tert-butyl phenol); 2,2'-methylene-bis-(4-methyl-6-tert-butyl phenol); (alpha,alpha-dimethylbenzyl)diphenylamine; 1,1,3-tris(2 methyl)-4-hydroxy-5-tert-butylphenyl butane; 2,2'methylene bis(4-ethyl-5-tertbutyl phenol); 4,4'-methylene-bis-(2,6-di-tert-butylphenol); and alkylated hyrdroquinone.

6. The apparatus according to claim 1 wherein the first and second end seals comprise a gel having a cone penetration value as measured according to ASTM D217-68 at 21° C. of 50–200 (10$^{-1}$ mm) and an ultimate elongation as measured according to ASTM D638-80 at 21° C. of at least 50%, the gel having a first aperture through which the first cable can pass, and a casing that at least partially surrounds the gel, that has at least one external circumferentially-extending convolution, and that has an aperture through the thickness thereof through which the gel extends to contact circumferentially-extending gel at an external surface of the casing 7. The apparatus according to claim 6 wherein the wrap further includes an acid scavenger selected from the group consisting of zinc oxide, calcium oxide, dibasic lead phthalate, sodium carbonate, calcium carbonate, sodium hydroxide, sodium bicarbonate, calcium hydroxide, ammonia, epoxidized soybean oil, barium stearates, cadmium stearates, zinc stearates, barium carboxylates, cadmium carboxylates, zinc carboxylates, dibasic lead phosphite, tribasic lead sulphate, sodium phosphate, dialkyl tindichloride, and mixtures thereof.

8. The apparatus according to claim 7 wherein the antioxidant is selected from the group consisting of, tris (3,5-di-tert-butyl-4-hydroxybenzyl)isocyanurate; tetrakis [(methylene 3(3',5'-di-t-butyl-4'-hydroxyphenyl)] propionate methane; octadecyl 3-(3',5', -di-tert-butyl-4'-hydroxyphenyl) propionate; 4,4'thiobis-(6-tert-butyl meta cresol); 4,4'-butylidene bis(6-tert-butyl meta cresol); 1,3,5-trimethyl-2,4,6-tris ( 3,5,-di-tert-butyl-4-hydroxy benzyl) benzene; 2,2'-ethylidene-bis (4,6-di-tert-butyl phenol); 2,2'-methylene-bis-(4-methyl-6-tert-butyl phenol); (alpha,alpha-dimethylbenzyl)diphenylamine; 1,1,3-tris(2 methyl)-4-hydroxy-5-tert-butylphenyl butane; 2,2'methylene bis(4-ethyl- 5-tert-butyl phenol); 4,4'-methylene-bis-(2,6-di-tert-butylphenol); and alkylated hyrdroquinone.

9. The apparatus according to claim 8 wherein the wrap further includes gel sealing strips on the edges of the wrap.

10. The apparatus according to claim 8 wherein the housing and wrap form an integral unit.

11. A cable sealing kit which comprises:

a first end seal;

a second end seal;

a housing for joining the first and second end seals, said housing forming a cable splice area between the first and second end seals; and a polymeric wrap containing an antioxidant compound(s) and an acid scavenger compound(s) for surrounding the cable splice wires, said polymeric wrap having a surface facing the housing which is impervious to antioxidant blooming and a surface opposite thereto which is capable of blooming at least the antioxidant compound(s) toward the cable splice wires and wherein the polymeric wrap includes a felt which contains said antioxidant compound(s) and said acid scavenger compound(s).

* * * * *